(12) United States Patent
Johnson et al.

(10) Patent No.: US 8,528,936 B2
(45) Date of Patent: Sep. 10, 2013

(54) RAIN HAZARD ELIMINATOR

(76) Inventors: Rickey Johnson, Wichita, KS (US);
Kimberly Jones-Johnson, Wichita, KS (US)

( * ) Notice: Subject to any disclaimer, the term of this patent is extended or adjusted under 35 U.S.C. 154(b) by 434 days.

(21) Appl. No.: 12/943,411

(22) Filed: Nov. 10, 2010

(65) Prior Publication Data

US 2012/0112446 A1    May 10, 2012

(51) Int. Cl.
- *B05B 1/28* (2006.01)
- *B05B 1/02* (2006.01)
- *B05B 15/10* (2006.01)

(52) U.S. Cl.
USPC ..... 280/757; 180/271; 239/288.3; 239/288.5; 239/744; 239/754

(58) Field of Classification Search
USPC .......... 180/116, 119, 271, 164, 165, 2.1, 180/2.2; 280/851, 855, 757; 239/288, 288.3, 239/288.5, 754, 744
See application file for complete search history.

(56) References Cited

U.S. PATENT DOCUMENTS

| | | | | |
|---|---|---|---|---|
| 3,544,370 A | * | 12/1970 | Wrede | 134/37 |
| 3,809,167 A | * | 5/1974 | Glider | 172/831 |
| 3,834,732 A | * | 9/1974 | Schons | 280/851 |
| 4,324,307 A | * | 4/1982 | Schittino et al. | 180/313 |
| 4,640,541 A | * | 2/1987 | FitzGerald et al. | 296/180.1 |
| 4,848,510 A | * | 7/1989 | Ahmed | 180/309 |
| 5,273,315 A | * | 12/1993 | Debus | 280/762 |
| 5,555,594 A | * | 9/1996 | Maddalena | 15/313 |
| 6,488,217 B1 | * | 12/2002 | Donastorg | 239/131 |
| 6,848,726 B1 | * | 2/2005 | Horsham | 291/3 |
| 6,949,621 B2 | * | 9/2005 | Makioka et al. | 528/398 |
| 2010/0140006 A1 | * | 6/2010 | Frierman | 180/165 |

\* cited by examiner

*Primary Examiner* — John R Olszewski
(74) *Attorney, Agent, or Firm* — Howard M. Cohn

(57) ABSTRACT

A system and method to reduce water spray from one or more truck tires of a truck driving through rain on a water covered road. A combination centrifuge and air compressor device collects a mixture of air and rainwater, to separate the air from the rainwater and to compress the air. An air distribution manifold system directs the compressed air from the combination centrifuge and air compressor device onto an area of the water covered road in front of one or more of the truck's tires so that the water from the area rises up from the road. Then a shield barrier channels the water that rises up from the area on the road away from one or more of the truck's tires.

11 Claims, 3 Drawing Sheets

RAIN HAZARD ELIMINATOR

TECHNICAL FIELD OF THE INVENTION

The present invention relates generally to a device to safely divert water from a truck's tires. More specifically, the present invention relates to a water collection and channeling device for use with a truck and methods for safely displacing water away from a truck's tires.

BACKGROUND OF THE INVENTION

A common problem encountered during highway driving is the visibility obscuring water spray that is generated by trucks, tractor-trailer rigs and other large-tired vehicles. As the tired vehicle moves over a wet surface, the rotation of its tires generates a water spray that is turbulently discharged from the vehicle in a direction generally transverse to the direction of vehicle movement. Particularly in cases of vehicles moving at fast highway speeds, water is flung laterally outward from the underside of the vehicle and past the lateral sides of the vehicle. This laterally moving water spray is a problem to vehicles behind, to the side of, and approaching the truck or tractor-trailer. In many cases this lateral discharge of spray can so obscure visibility as to make it extremely hazardous to drive past or behind such a vehicle under wet road conditions. Additionally, in winter conditions, salt water spray thrown laterally is damaging to vegetation.

A device is needed to rectify the above-mentioned problems. Such an invention would lead to safer roads, with fewer accidents, and a more pleasant driving experience. The present invention seeks to provide such an answer.

SUMMARY OF THE INVENTION

A system is provided to reduce water spray from one or more truck tires of a truck driving through rain on a water covered road. This system includes a combination centrifuge and air compressor device to collect a mixture of air and rainwater, to separate the air from the rainwater and to compress the air. There is an air distribution manifold system to direct the compressed air from the combination centrifuge and air compressor device onto an area of the water covered road in front of one or more of the truck's tires so that the water from the area rises up from the road. Finally, there is a shield barrier to channel the water that rises up from the area on the road away from one or more of the truck's tires.

A method is provided for reducing water spray from one or more tires of a truck driving through rain on a water covered road. The first step includes collecting a mixture of air and rainwater, separating the air from the rainwater and compressing the air. The second step is directing the compressed air onto an area of the water covered road in front of one or more of the truck's tires so that the water from the area rises up from the road. The third step is channeling the water that rises up from the area on the road away from one or more of the truck's tires.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
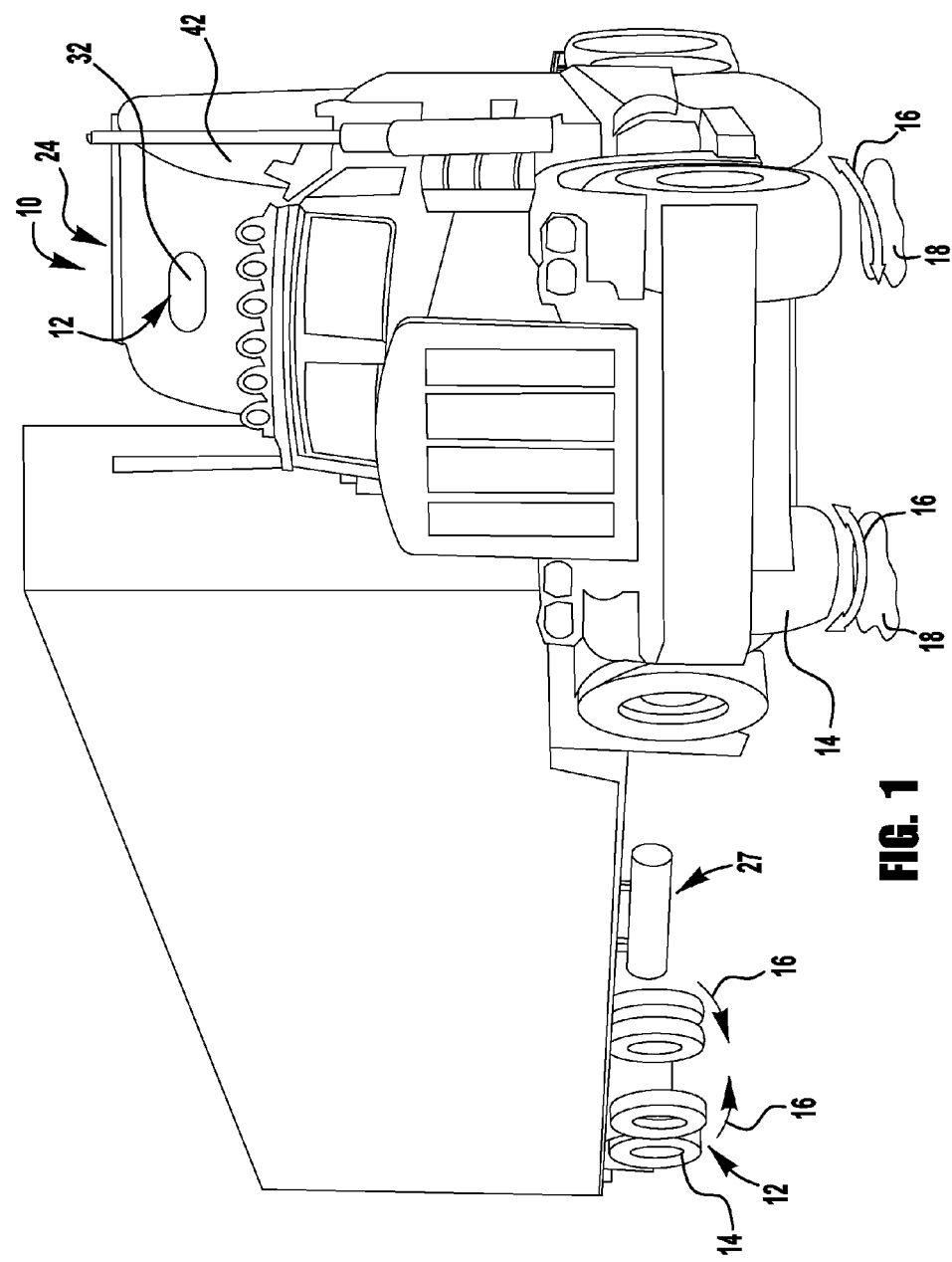
FIG. 1 is a three-dimensional view of a semi-trailer truck complete with a water centrifuge/air distribution manifold to alleviate water spray, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The present invention is directed to a system of redirecting rainwater from the area in front of one or more of a truck's tires when the truck is driving down a water covered road. This alleviates the problem of the turbulent discharge of rainwater being otherwise flung from a moving truck.

Referring to FIG. 1, a truck 10 such as a semi-trailer truck is illustrated having an air distribution manifold system 12 designed to reduce and partially prevent water spray from tires 14, including the tire and tire assembly, that is turbulently discharged from the truck 10 in a direction generally transverse to the direction of vehicle movement. The air distribution manifold system 12 directs a stream of pressurized air, indicated in general by an arrow 16, to an area 18 of the street or road in front of one or more of all the tires 14, so that as the tires meet the road, they will encounter less or no water, as compared to tires without the stream of pressurized air directed to the pavement directly in front of the tire.

In general terms, the velocity of truck 10 is used to capture a mixture of air and rainwater into the air distribution manifold system 12. Then, the rainwater is directed to a safe location, and the remaining dry air is compressed and directed to the area 18 of the roadway in front of one or more of the tires 14. The air distribution manifold system 12 is mounted upon the semi-trailer truck 10, in one of a number of locations as discussed hereinafter.

Figure 2:
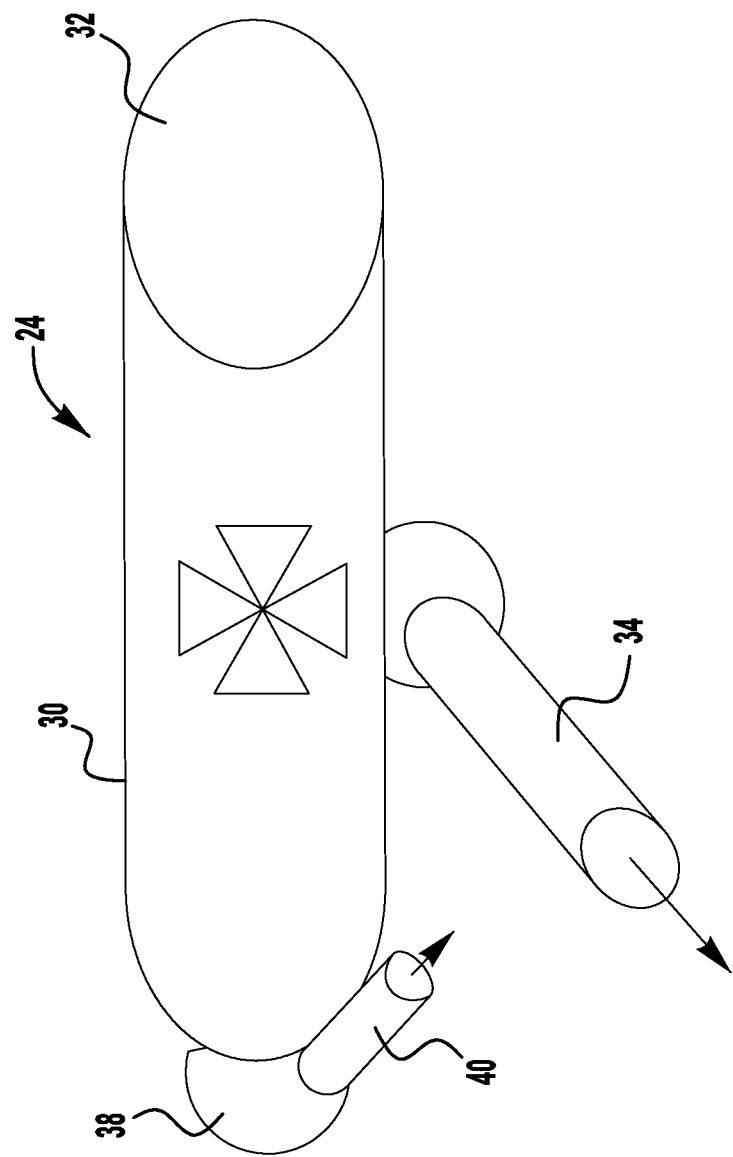
FIG. 2 is a three-dimensional side view of the water centrifuge/air distribution manifold, in accordance with the present invention.

Referring to FIG. 2, a side view of the combination centrifuge and air compressor device 24 of the air distribution manifold system 12 is illustrated. As the semi-trailer truck 10 moves along the road, a mixture of air and rainwater passes through opening 32 of the combination centrifuge and air compressor device 24. Then the rainwater and air mixture are separated and directed out of the combination centrifuge and air compressor device 24, as will be explained.

Figure 3:
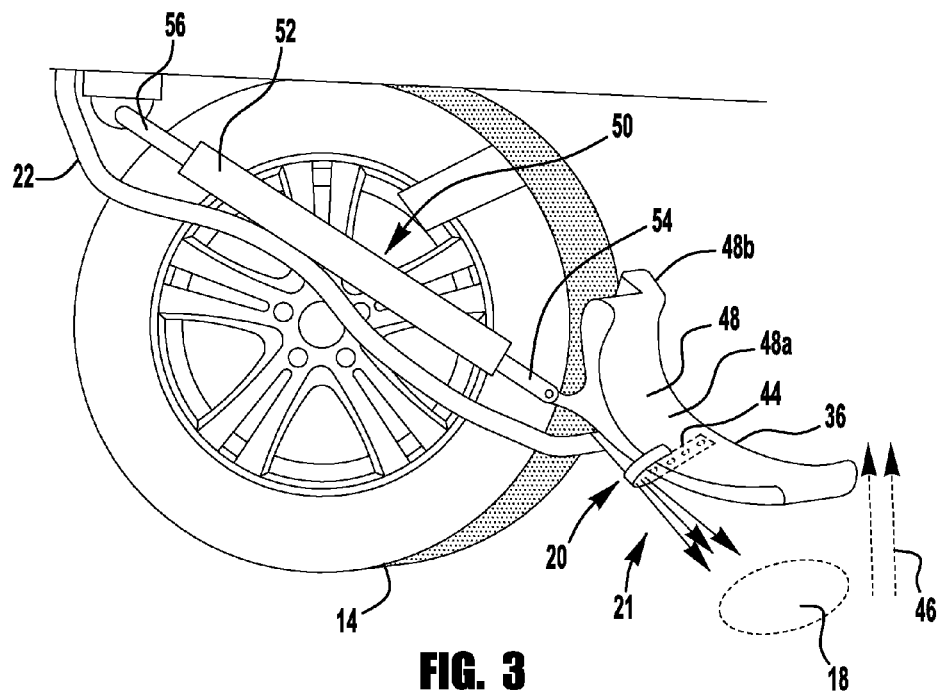
FIG. 3 is a three-dimensional side view of a tire with the air manifold and air fold protector, in accordance with the present invention.

The air distribution manifold system 12 includes an air manifold 20, see FIG. 3, disposed in front of one or more of the tires 14 to direct a stream of pressurized dry air 21 onto a section 18 of the road or surface directly in front of the tire. The air manifold 20 can consist of an air tube 22 which extends from the manifold 20 to a combination centrifuge and air compressor device 24, as shown in FIG. 2. Each of the air tubes 22, which are connected to an air manifold 20, can be connected at one end to a primary, pressurized air pipe 40, see FIG. 2. The opposite end of air tubes 22 are connected directly to the air manifolds 20 which can be formed in a section at the rear of the shield barrier 36, as shown in FIG. 3.

The combination centrifuge and air compressor device 24, as shown in FIG. 2, includes a housing 30 with an inlet opening 32 into which flows a mixture of air and rainwater when the truck is driving through the rain. Within the housing 30 is a centrifuge (not shown) which separates the air mixed with rainwater. The water exits the housing 30 though a water pipe 34 and flows onto the roadway between a set of tires, such as the front tires. Alternatively, the water can be directed through the water pipe 34 onto the shield barrier 36, as shown in FIG. 3, and discussed below. In this way, the dispersion of the water will be controlled and directed away from the truck in a stream, as opposed to the water being turbulently discharged from the side of the truck as when the water gets on the treads of the tires 14.

The air separated by the centrifuge in the combination centrifuge and air compressor device 24 from the rain water entering the inlet opening 32 is directed into a compressor 38, which is used to generate an air pressure sufficient to clear the pavement in front of the tires of water, and out through air pipe 40. As explained before, the pressurized dry air in pipe 40 is then directed to air tubes 22.

As shown in FIG. 1, the combination centrifuge and air compressor device 24 can be mounted on top of the tractor of truck 10, (note the inlet 32 formed in the air deflector 42 of the cab). Alternatively, the combination centrifuge and air compressor device 24 can be mounted in any other location on truck 10 so that the inlet 32 can collect the mixture of air and rainwater, such as under the trailer 16, as shown in FIG. 1. This location, under trailer 16, may be advantageous as a manner of reducing the noise heard by the driver.

Figure 4:
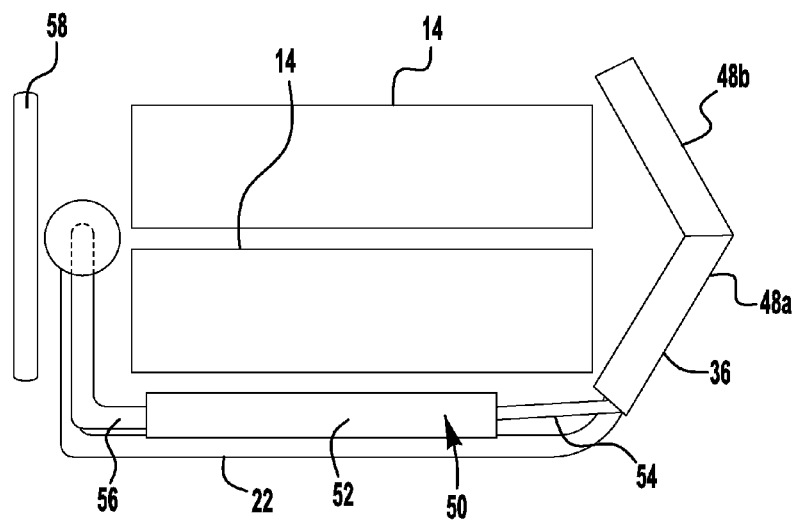
FIG. 4 is a top view of a tire with the air manifold and air fold protector, in accordance with the present invention.

Referring to FIG. 3, there is a side view of a tire 14 with the air manifold 20 of air distribution manifold system 12 connected to air pipe 22. Note that while a single tire 14 is shown, typically, there is a pair of tires 14, as illustrated in FIG. 4. The air that is channeled through air pipe 22 passes through a series of openings 44 formed in the air manifold 20. The streams 21 of pressurized air are directed onto the roadway to clear the water from the road immediately in front of tire(s) 14. The water from the area 18 in front of the tire rises, see arrows 46, and is captured by the concave shaped front surface 48 of the shield barrier 36. The shield barrier 36 may be V-shaped as illustrated in FIG. 4, in order to channel the road water away from the tire(s) 14 so as to deliver the channeled water to the road surface in as controlled a manner as possible.

Being that the shield barrier 36 can have a V-shape, similar to a snow plow, the water on the concave shaped front surface 48 can flow across either side 48a or 48b and outward from the truck back onto the pavement in a controlled manner without causing the rainwater to be turbulently discharged as when the water contacts the tread of the tire. The effect is that there is little to no water to be flung from tire 14, creating much safer driving conditions for vehicles behind or passing the truck 10.

Referring to FIGS. 3 and 4, the shield barrier 36 is mounted to an air manifold protector 50, which is designed to protect the air manifold 20. The shield barrier 36 is normally held in a first position, by means such as an advanced electronic sensor (not shown), with respect to the truck tire 14. The air manifold protector 50 includes a hydraulic cylinder 52 which houses a piston (not shown) and first and second connecting rods 54 and 56 secured to the piston and extending out from opposite ends of the hydraulic cylinder 52. The hydraulic cylinder 52 is mounted by the first connecting rod 54 to the side or rear of the shield barrier 36. The opposite end of the hydraulic cylinder 52 is mounted to the bottom of truck 10 by the second connecting rod 56. In operation, if the shield barrier 36 comes into contact with a foreign object on the road (such as a rock) and the foreign object forces it back from its original position to beyond a set position closer to the tire 14, the hydraulic cylinder 52 will be actuated causing the cylinder to move upwards towards the bottom of the trailer 16 so that the air manifold 20 and the shield barrier 36 are deployed to a safe position close to the bottom of the trailer 16. Then, in a preset amount of time, the hydraulic cylinder 52 will slowly redeploy the air manifold 20 and shield barrier 36 back to its original operation position, as shown in FIG. 3.

Note that as shown in FIG. 4, the hydraulic cylinder 52 is offset from the tires towards the inside of the trailer (the non-curb side). Behind the tires is shown a mud flap 58.

The system of the present invention can be used on the front set of four tires on each side of both the tractor and trailer set of tires.

In operation, the air distribution manifold system 12 is meant to be used when it is raining and the roads are wet. A mixture of rainwater and air are collected in a combination centrifuge and air compressor device 24 in which the air is separated, pressurized and sent to an air manifold in front of the tires 14. The air is directed onto the pavement in front of the tire to dry the pavement so that the water on the roadway is not picked up in the tire treads and slung out from the truck 10 as a mist causing a hazard to passing vehicles.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A system to reduce water spray from one or more truck tires of a truck driving through rain on a water covered road, comprising:
   a combination centrifuge and air compressor device to collect a mixture of air and rainwater, to separate the air from the rainwater and to compress the air;
   an air distribution manifold system to direct the compressed air from the combination centrifuge and air compressor device onto an area of the water covered road in front of the one or more truck tires so that the water from the area rises up from the road; and
   a shield barrier to channel the water that rises up from the area on the road away from the one or more truck tires.

2. The system of claim 1 wherein the air distribution manifold system includes an air manifold having a series of openings to direct streams of compressed air onto the area of the water covered road in front of the one or more tires to raise the water from the road immediately in front of the one or more tires.

3. The system of claim 2 wherein the air distribution manifold system includes an air tube which extends from the combination centrifuge and air compressor device to the air manifold disposed at the rear of the shield barrier.

4. The system of claim 3 wherein the shield barrier has a concave shaped front surface to channel the water away from the one or more truck tires.

5. The system of claim 4 wherein the concave shaped front surface may be V-shaped so that the water on the concave shaped front surface can flow to either side of the shield barrier and outward from either side of the truck.

6. The system of claim 5 further including an air manifold protector mounted to the shield barrier and the truck to protects the air manifold.

7. The system of claim 6 wherein the air manifold protector includes a hydraulic cylinder attached to the shield barrier with a first connecting rod and to the truck with a second connecting rod to enable the air manifold and the shield barrier to be deployed to a safe position in the event that an object forces the shield from its original position to beyond a set position.

8. The system of claim 7 wherein the air manifold protector will redeploy the air manifold and the shield barrier to its original operating position.

9. The system of claim 1 further including a water pipe attached to the combination centrifuge and air compressor device to channel the collected rainwater to a location away from the front of the one or more truck tires.

10. The system of claim 1 wherein the combination centrifuge and air compressor device is mounted on the truck in a location away from the front of the one or more truck tires.

11. The system of claim 1 wherein the combination centrifuge and air compressor device has an inlet opening to collect the mixture of air and rainwater.

* * * * *